(12) United States Patent
Uramoto et al.

(10) Patent No.: US 7,822,449 B2
(45) Date of Patent: Oct. 26, 2010

(54) COVER FOR MOBILE COMMUNICATION TERMINAL, AND MOBILE COMMUNICATION TERMINAL

(75) Inventors: Yoshihiro Uramoto, Tokyo (JP); Shin Daido, Tokyo (JP); Nobuyuki Enomoto, Kyoto (JP); Fuji Asada, Kyoto (JP)

(73) Assignee: Vodafone K. K., Tokyo (JP)

( * ) Notice: Subject to any disclaimer, the term of this patent is extended or adjusted under 35 U.S.C. 154(b) by 644 days.

(21) Appl. No.: 11/790,952

(22) Filed: Apr. 30, 2007

(65) Prior Publication Data

US 2007/0201689 A1  Aug. 30, 2007

Related U.S. Application Data

(63) Continuation of application No. PCT/JP2006/300609, filed on Jan. 18, 2006.

(30) Foreign Application Priority Data

Jan. 18, 2005  (JP)  ............................. 2005-010007

(51) Int. Cl.
*H04M 1/00* (2006.01)
(52) U.S. Cl. .................. 455/575.8; 455/575.3; 379/451
(58) Field of Classification Search ............. 455/575.1, 455/575.3, 575.8, 90.3; 379/437, 440, 451
See application file for complete search history.

(56) References Cited

U.S. PATENT DOCUMENTS

| | | | |
|---|---|---|---|
| 5,890,052 A * | 3/1999 | Read et al. | 455/575.3 |
| 6,201,867 B1 * | 3/2001 | Koike | 379/433.11 |
| 6,999,805 B2 * | 2/2006 | Gartrell et al. | 455/575.8 |
| 7,099,710 B1 * | 8/2006 | Faillance | 455/575.8 |
| 7,206,618 B2 * | 4/2007 | Latto et al. | 455/575.8 |
| 7,444,176 B2 * | 10/2008 | Oda et al. | 455/575.3 |
| 7,529,364 B2 * | 5/2009 | Buehler | 379/451 |

(Continued)

FOREIGN PATENT DOCUMENTS

JP  10-190796  7/1998

(Continued)

OTHER PUBLICATIONS

Japanese Office Action mailed May 26, 2010.

*Primary Examiner*—Duc M Nguyen
(74) *Attorney, Agent, or Firm*—Kratz, Quintos & Hanson, LLP

(57) ABSTRACT

In a front surface leather portion of a cover 10, there are formed a display surface opening portion 14 for exposing a display screen of a display of a mobile communication terminal 90, an operating surface opening portion 15 for exposing an operating surface of an input device of the terminal 90, and a fitting opening portion 16 for fitting this cover 10 to the terminal 90. Accordingly, even when the cover 10 is fitted, it is possible for the user both to check the display screen of the terminal 90 from the portion 14 and to actuate the input device of the terminal 90 from the portion 15. Due to this, it is possible to implement a cover for a mobile communication terminal which, along with maintaining a good operating feeling and serving as cushioning material in the case of shock, can also impart a soft texture and a sense of high quality.

5 Claims, 19 Drawing Sheets

U.S. PATENT DOCUMENTS

| | | | |
|---|---|---|---|
| 2002/0174994 A1* | 11/2002 | Wu | 174/35 R |
| 2002/0175099 A1* | 11/2002 | Wu | 206/320 |
| 2004/0203486 A1* | 10/2004 | Shepherd et al. | 455/90.1 |
| 2005/0153757 A1* | 7/2005 | Maenpaa et al. | 455/575.8 |
| 2006/0160586 A1* | 7/2006 | Cheng | 455/575.8 |
| 2009/0104949 A1* | 4/2009 | Sato et al. | 455/575.3 |

FOREIGN PATENT DOCUMENTS

| | | |
|---|---|---|
| JP | 11-192116 | 7/1999 |
| JP | 3076431 | 1/2001 |
| JP | 2002-218037 | 8/2002 |
| JP | 2003-324511 | 11/2003 |
| JP | 2004-337342 | 12/2004 |

* cited by examiner

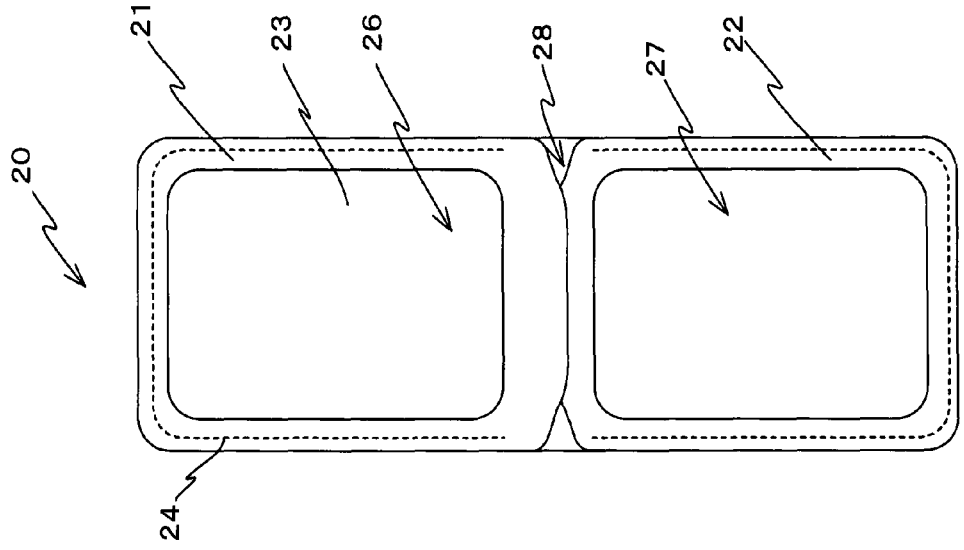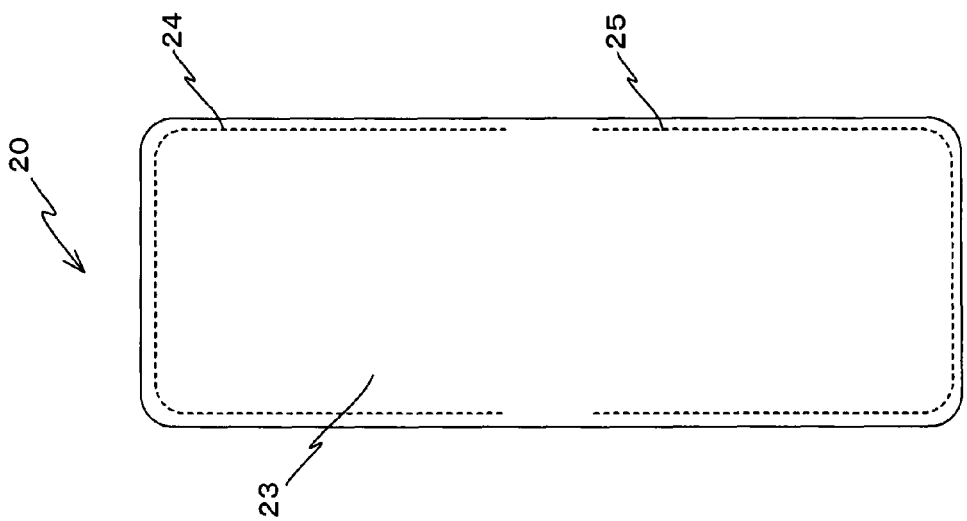

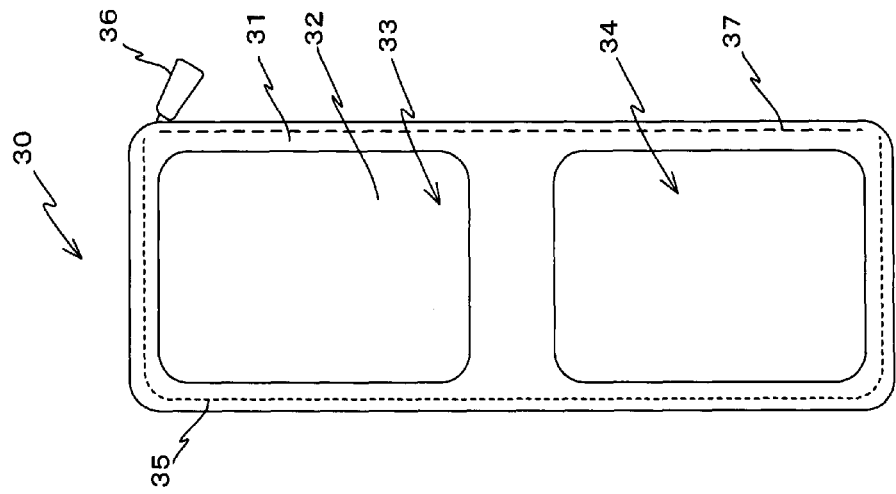
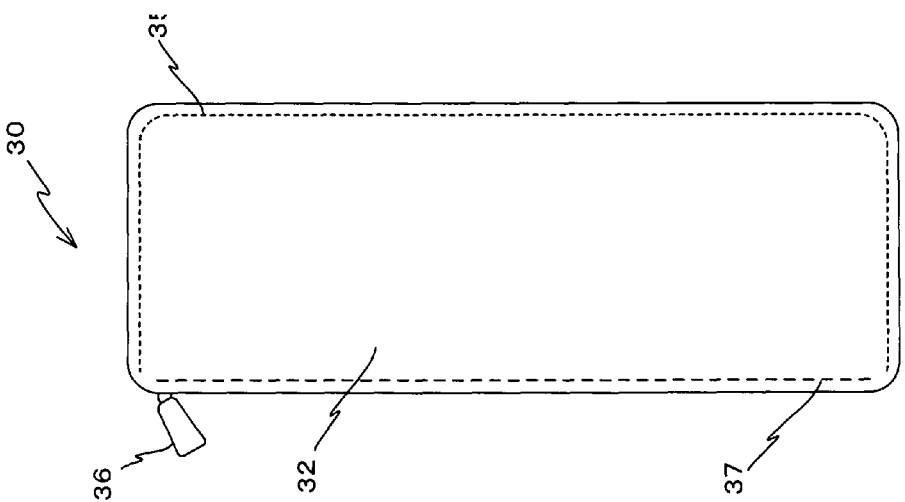

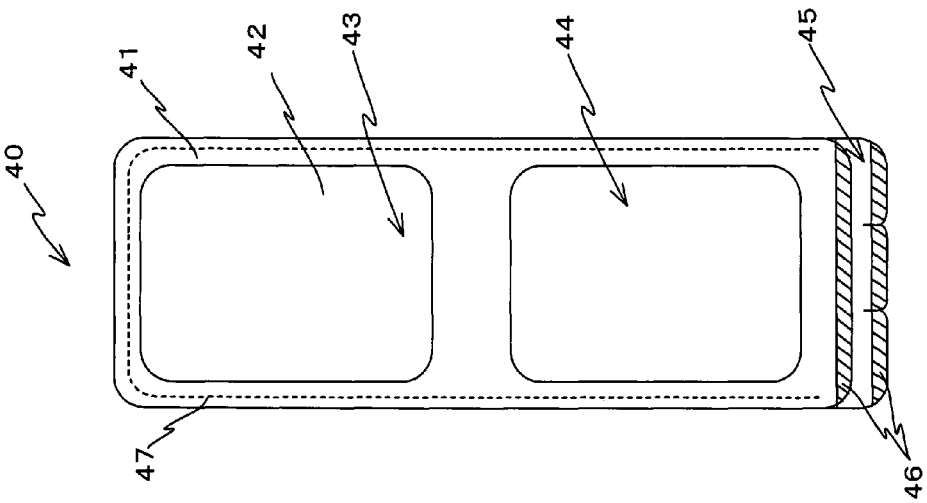
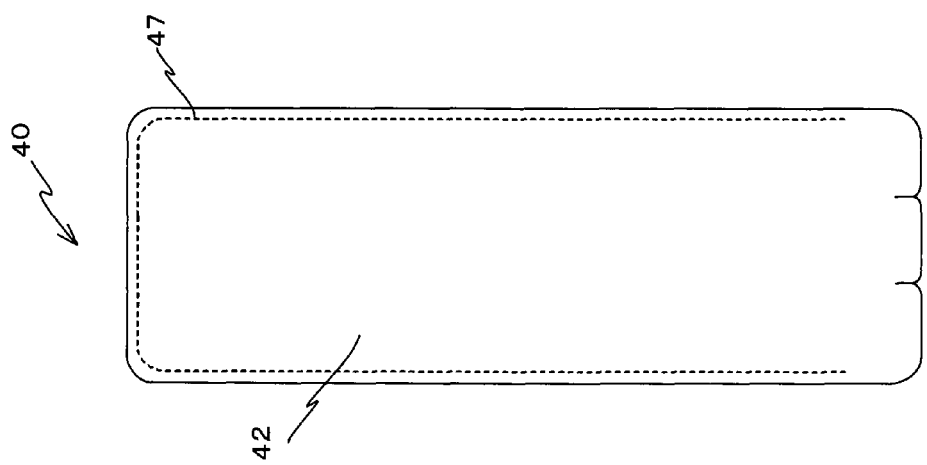

COVER FOR MOBILE COMMUNICATION TERMINAL, AND MOBILE COMMUNICATION TERMINAL

RELATED APPLICATION

This is a continuation application of the international patent application No. PCT/JP2006/300609 filed with Application date: Jan. 18, 2006. The present application is based on, and claims priority from, J.P. Application 2005-01007, filed on Jan. 18, 2005, the disclosure of which is hereby incorporated by reference herein its entirety.

BACKGROUND OF THE INVENTION

The present invention relates to a cover for a mobile communication terminal and to a mobile communication terminal, and more particularly relates to a cover for a mobile communication terminal which is integrated with a mobile communication terminal, and to a mobile communication terminal to which such a cover for a mobile communication terminal can be fitted.

BACKGROUND ART

In the prior art, mobile communication terminals, such as, among others, cellular phones, have become widespread. With such mobile communication terminals, with regard to elements based upon internal functions such as wallpaper or ring tones or the like, they are designed so that the user can change them by himself so that they accord with his own taste. Recently it has also become general to implement embellishment to a mobile communication terminal, not only with respect to elements based upon internal functions, but also by the user gluing on a sticker to a facing member; and one type of portable telephone exists which has a facing member which the user can fit and remove, upon the exterior of the chassis which constitutes that mobile communication terminal (refer to Patent Document No. 1).

Moreover, since a mobile communication terminal is an electronic device, it is endowed with the characteristic of being weak as regards to shock when it is dropped or the like. However, in Japan it is not usual to fit a cover for absorbing shocks, irrespective of whether it is actually desirable to utilize a fitted cover for absorbing shocks. As a first reason for this, it may be suggested that fitting a cover which requires time and labor for the user to fit and to remove is clearly not desirable, when considered from the aspect of simplicity of user operation. Furthermore, as a second reason, it may be suggested that, if a flexible material is used for a cover which can be fitted and removed, the functionality of the mobile communication terminal, such as that of its key pad (its input device, hereinafter termed its "numerical key") or that of its liquid crystal screen (its display section), may be deteriorated. In concrete terms, it may be suggested that, due to the cover sliding and blocking the key pad surface, the liquid crystal screen may become difficult for the user to see.

Patent Document No. 1: Japanese Laid-Open Patent Publication 2003-324511.

SUMMARY OF THE INVENTION

As described above, although various embellishments corresponding to the individuality of the user are often made to a mobile communication terminal, these are not usually made with a material which is flexible, but are often made with a material made from some cold and hard inorganic substance, for example one made from magnesium alloy or plastic. If a cover made from a flexible substance for absorbing shock is fitted to a mobile communication terminal, then, as described above, it can easily deviate from its proper covering position, and there has been a possibility of loss of the functionality of the mobile communication terminal.

The present invention has been conceived in consideration of the circumstances described above, and takes as its object to provide a cover for a mobile communication terminal, which, by imparting a sense of unification with the mobile terminal device, while maintaining the same operating feeling as when no cover is present, along with constituting cushioning material if a shock is experienced, can also provide a soft texture and a sense of high quality; and the present invention also takes as its object to provide a mobile communication terminal to which such a cover for a mobile communication terminal can be fitted. Overall, the present invention takes it as its object, if a flexible material is employed for the cover, to prevent this cover deviating in its covering position and thereby covering the surface of some member which is essential for the operation of the mobile communication terminal, thus constituting an obstacle to operation thereof; and thus the present invention takes it as its object to prevent any deterioration of the functionality of the mobile communication terminal.

According to a first aspect thereof, the present invention is a first cover for a mobile communication terminal, characterized by being made from a material which is flexible, and by covering a side wall surface which contacts, at an edge, a surface upon which is provided an information input-output portion of said mobile communication terminal which performs input-output of information, so as to expose at least a portion of said information input-output portion.

In this case, the term "a material which is flexible" means a material such as a textile, including a fabric made from various types of fiber and a knitted material, and a non-woven fabric or leather or the like. As a concrete example of the "information input-output portion", there is a numerical key which performs input or a display which performs display output. Since a camera or the like is also a device which inputs information, it is included in the term "information input-output portion". If, for example, a display is used as the information input-output portion, then the term "side wall surface" means a surface which constitutes the side aspect of the body of the mobile communication terminal, when its surface which includes the display is made to be its upper surface. Furthermore, in the case of a foldable type body, this term is not to be taken as including its side which constitutes its axis for folding. Moreover, "covering a side wall surface" means being in the state of covering all of the side wall surface, so that the side wall surface cannot be seen from the exterior.

In other words, with this first cover for a mobile communication terminal according to the present invention, while the side wall surface is covered with the flexible member, at least a portion of the information input-output portion is exposed. Accordingly, with this cover for a mobile communication terminal, since the portion which is covered is large and moreover the vacant space between the cover and the mobile communication terminal is small, accordingly it is possible to impart to the user an impression that the mobile communication terminal and the cover are a single unit, and thereby, along with maintaining the same operating feeling as when no cover is fitted and providing cushioning material in the event of a shock, it is also possible to impart a soft texture and a sense of high quality.

Furthermore, with this first cover for a mobile communication terminal according to the present invention, it is possible to include, in said information input-output portion which is exposed, at least an actuation portion of an actuation means which is an input device, and a display portion of a display means which is an output device. In this case, this cover becomes one which exposes the actuation portion of the actuation means such as a numerical key or the like, and the display portion of the display means such as a display or the like. Accordingly, by exposing the actuation means and the display means which are utilized by the user, it is possible to maintain the same operating feeling as when no cover is present.

Moreover, with this first cover for a mobile communication terminal according to the present invention, it is possible for this cover to be attached by a fixed panel which is fitted to the periphery of said exposed information input-output portion. In this case, by fixing the cover with the periphery of the information input-output portion, it is possible to integrate the cover with the mobile communication terminal, and it is accordingly possible to maintain the same operational feeling as when no cover is present.

Yet further, with this first cover for a mobile communication terminal according to the present invention, it is possible for there to be further included a fastener portion which can be opened and closed at a portion which covers said side wall surface, and for said mobile communication terminal to be inserted from said fastener portion which has been opened. In this case, due to the provision of the fastener member, it is possible to provide a cover which is easy to fit and to remove.

Still further, with this first cover for a mobile communication terminal according to the present invention, it is possible for said mobile communication terminal to be rotatable to fold up, and for said flexible member to include a narrow and long opening portion at a portion thereof which covers a rotational axis portion for said folding up rotation, and for said mobile communication terminal to be inserted from said opening portion in the folded up state. In this case, by taking advantage of the folded up state of the mobile communication terminal to insert it, it is possible to make the portion dedicated to insertion small so that it is not conspicuous, and accordingly it is possible to maintain the same operating feeling as when no cover is present.

According to a second aspect thereof, the present invention is a second cover for a mobile communication terminal, which is made from a flexible material and a member for fixing, and which is attached by said member for fixing being fixed to a side wall surface which contacts, at an edge, a surface upon which an information input-output portion of said mobile communication terminal which performs input-output of information is provided, so as to expose at least a portion of said information input-output portion.

In this case, the meanings of the terms "flexible material", "information input-output portion", and "side wall surface" are the same as the meanings previously described and explained. With this second cover for a mobile communication terminal, the member for fixing is coupled to the flexible member by being adhered or sewn on or the like thereto, and is fitted by being fixed to the side wall surface. Furthermore, even in the state in which the cover is fitted, at least a portion of the information input-output portion of the mobile communication terminal is exposed.

Accordingly, since the portion which is covered is large and moreover the vacant space between the cover and the mobile communication terminal is small, it is possible to impart to the user an impression that the mobile communication terminal and the cover are a single unit. Due to this, along with maintaining the same operating feeling for the mobile communication terminal as when no cover is fitted, and along with the cover serving as cushioning material in the event of a shock, it is also possible to impart a soft texture and a sense of high quality.

Moreover, with this second cover for a mobile communication terminal according to the present invention, it is possible, in said information input-output portion which is exposed, for there to be included at least an actuation portion of an actuation means which is an input device, and a display portion of a display means which is an output device. In this case, this cover becomes one which exposes the actuation portion of the actuation means such as a numerical key or the like, and the display portion of the display means such as a display or the like. Accordingly, by exposing the actuation means and the display means which are utilized by the user, it is possible to maintain the same operating feeling as when no cover is present. Moreover, by providing a member such as a panel or the like which can be fitted or removed to the periphery of the display means and/or the actuation means, and which fixes the cover position of the cover, it is possible to manifest the basic functions with which the present invention is endowed with yet a further layer of reliability.

Furthermore, with this second cover for a mobile communication terminal according to the present invention, it is possible for said mobile communication terminal to be capable of being rotated and folded, and for the cover to be fitted and removed with said mobile communication terminal in its folded state. In this case it is possible to fit and remove the resin member to and from the side wall surface in a simple manner, by inserting the mobile communication device in its folded up state.

According to a third aspect thereof, the present invention is a mobile communication terminal, to which the first or the second cover for a mobile communication terminal as described above can be fitted. Accordingly, by integrating this mobile communication terminal with the cover, it is possible for it to constitute a mobile communication terminal which along with maintaining the same operating feeling as when no cover is fitted and absorbing shocks, also has a soft texture and a sense of high quality.

As has been explained above, with this cover for a mobile communication terminal according to the first or second aspect of the present invention, and with this mobile communication terminal, since the portion which is covered is large and moreover the vacant space between the cover and the portable telephone is small, accordingly it is possible to impart to the user an impression that the mobile communication terminal and the cover are a single unit. Due to this, along with maintaining the operating feeling of the mobile communication terminal in the same manner as when no cover is fitted, since the cover also serves as cushioning material in the event of a shock, accordingly, along with protecting the mobile communication terminal against shock, the beneficial effect is also reaped of imparting a soft texture and a sense of high quality. Furthermore, by providing the fixing member, it is possible to prevent deviation of the covering position of the cover so as to cover the surface of a member which is essential to the functions of the mobile communication terminal, and accordingly it is possible to prevent deterioration of the operating feeling of the mobile communication terminal.

BRIEF DESCRIPTION OF DRAWINGS

FIG. 8A is an elevation view of a cover 20 for a portable telephone according to a second embodiment of the present invention;

FIG. 8B is a rear view of this cover 20 for a portable telephone according to the second embodiment of the present invention;

FIG. 11A is an elevation view of a cover 30 for a portable telephone according to a third embodiment of the present invention;

FIG. 11B is a rear view of this cover 30 for a portable telephone according to the third embodiment of the present invention;

FIG. 14A is an elevation view of a cover 40 for a portable telephone according to a fourth embodiment of the present invention;

FIG. 14B is a rear view of this cover 40 for a portable telephone according to the fourth embodiment of the present invention;

DETAILED DESCRIPTION

In the following, a first embodiment of the present invention will be explained with reference to FIGS. 1A through 5B; this first embodiment is cited as an example of a case in which leather is used as a raw material.

Figure 1A:
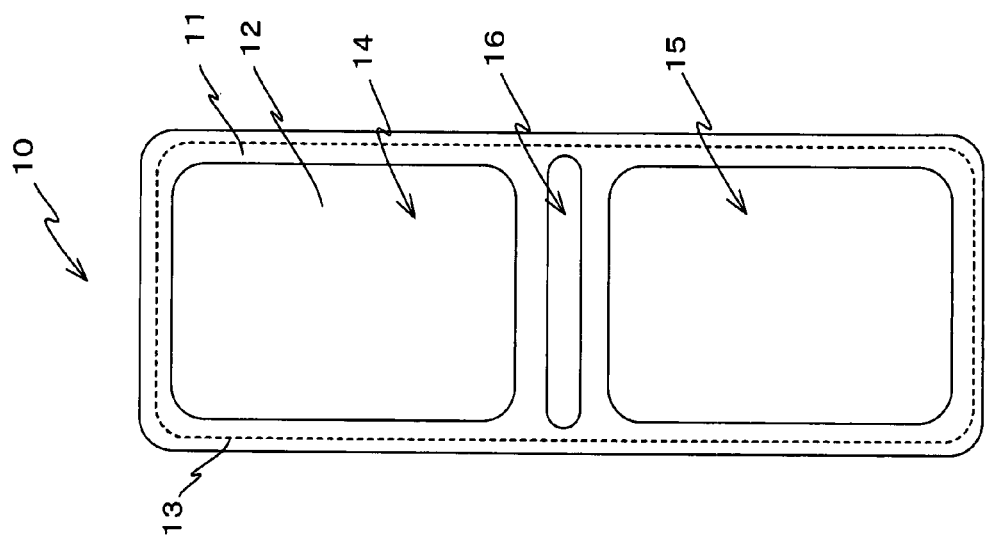
FIG. 1A is an elevation view of a cover 10 for a portable telephone according to a first embodiment of the present invention.
Figure 1B:
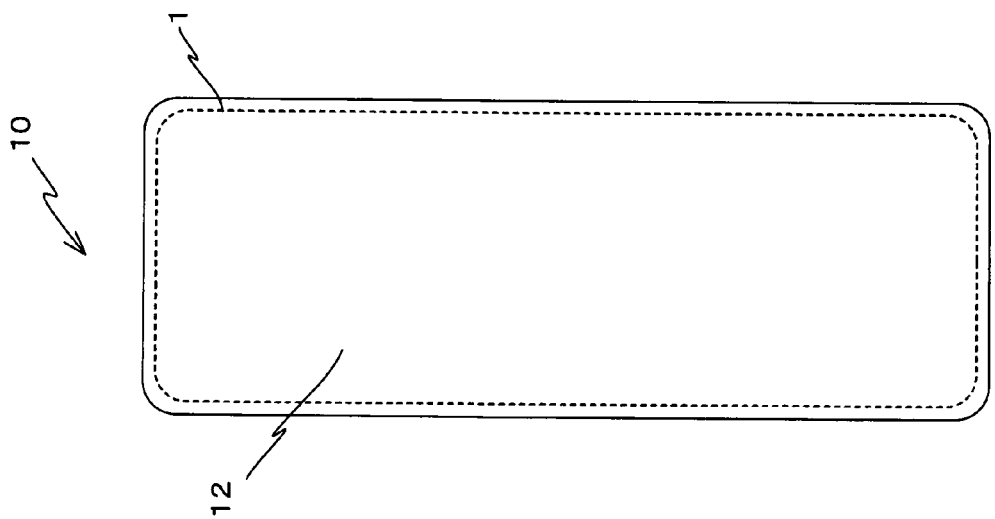
FIG. 1B is a rear view of this cover 10 for a portable telephone according to the first embodiment of the present invention.

In FIG. 1A there is shown an elevation view of a cover 10 for a portable telephone according to the first embodiment of the present invention (hereinafter simply referred to as the "cover 10"), and a rear view of this cover 10 is shown in FIG. 1B. As shown in FIGS. 1A and 1B, this cover 10 is made by stitching together, by a seam 13, two pieces of leather: a front surface leather portion 11 and a rear surface leather portion 12. Moreover, as shown in FIG. 1A, on the front surface leather portion 11 of this cover 10, there are formed (i) a display surface opening portion 14 for exposing a display screen of a display device of the portable telephone; (ii) an operation surface opening portion 15 for exposing an operating surface of an input device of the portable telephone; and (iii) an fitting opening portion 16 for fitting this cover 10 onto the portable telephone.

Figure 2:
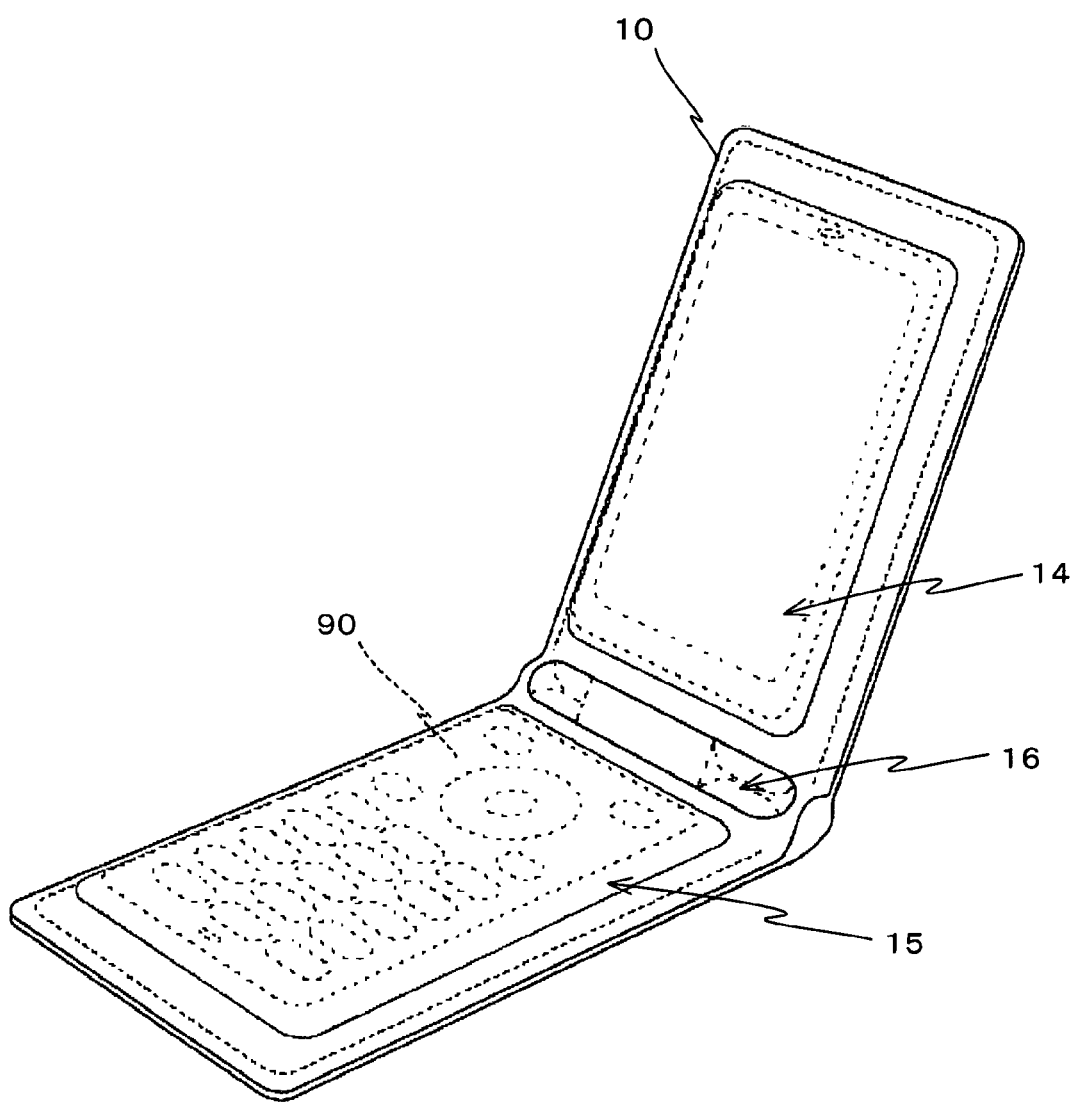
FIG. 2 is a figure showing a situation in which the cover 10 shown in FIGS. 1A and 1B is fitted upon a portable telephone 90.

In FIG. 2, the cover 10 is shown in the state of having been fitted upon the portable telephone 90. In this case, the portable telephone 90 is a foldable type portable telephone, and is shown by the dotted lines. As shown in this figure, even in the state in which the cover 10 is fitted, the user can check the display screen of the portable telephone 90 from the display surface opening portion 14 of the cover 10, and can actuate the key input device of the portable telephone 90 from the operating surface opening portion 15.

Figure 3:
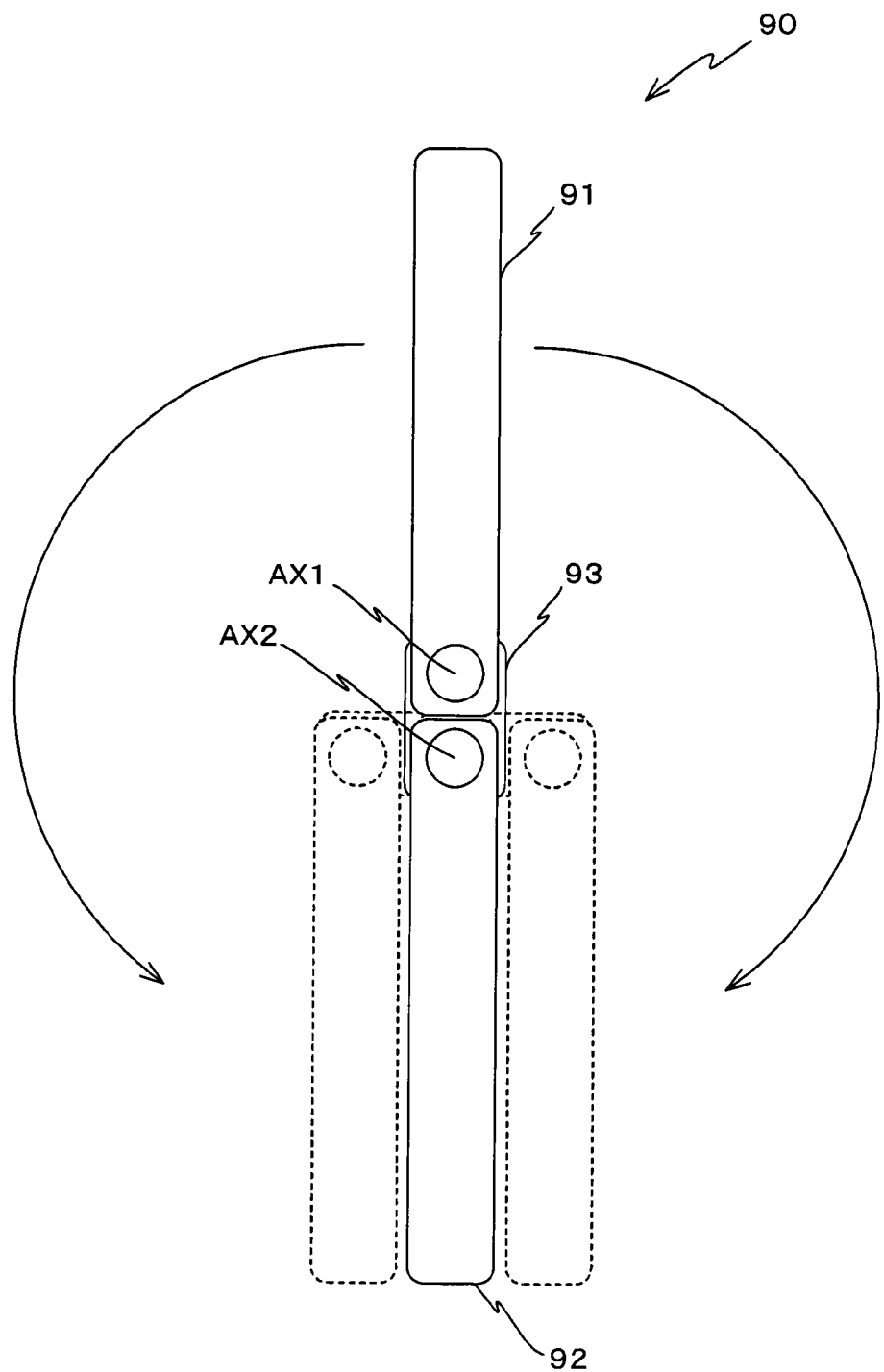
FIG. 3 is a figure schematically showing different states of the portable telephone 90 of FIG. 2.

In FIG. 3, there is shown a side view of the portable telephone 90. As shown in FIG. 3, since the display surface side portion 91 and the operating surface side portion 92 of the portable telephone 90 can both be rotated around respective axes AX1 and AX2 of a hinge portion 93, accordingly it is possible either to fold the operating surface and the display screen of the portable telephone 90 in the direction to mutually confront one another, or to fold the operating surface and the display screen in the direction to face mutually away from one another.

Figure 4:
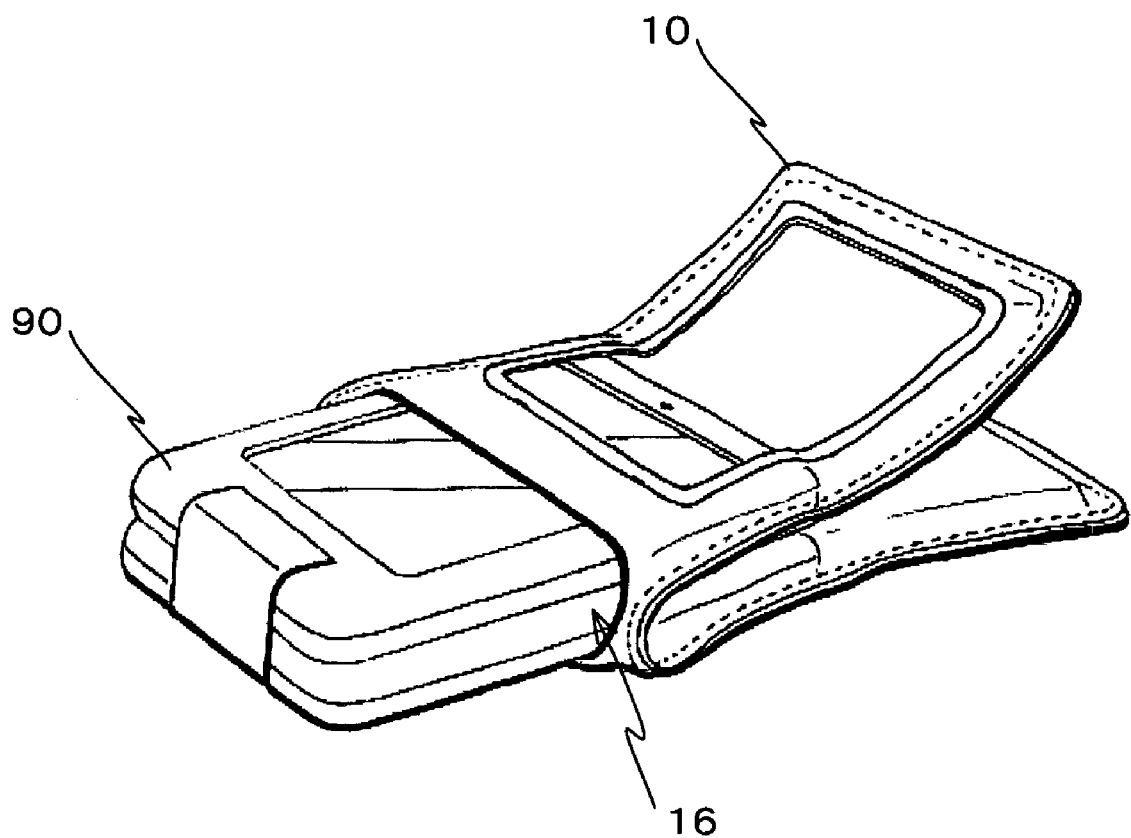
FIG. 4 is a figure showing the situation when the cover 10 shown in FIGS. 1A and 1B is being fitted.

Due to this, by folding the operating surface and the display screen of the portable telephone 90 in the direction to face mutually away from one another, as shown in FIG. 4, it is possible to fit the cover 10 upon the portable telephone 90 via the fitting opening portion 16 of the cover 10, and likewise to remove the cover 10 from the portable telephone 90.

Figure 5A:
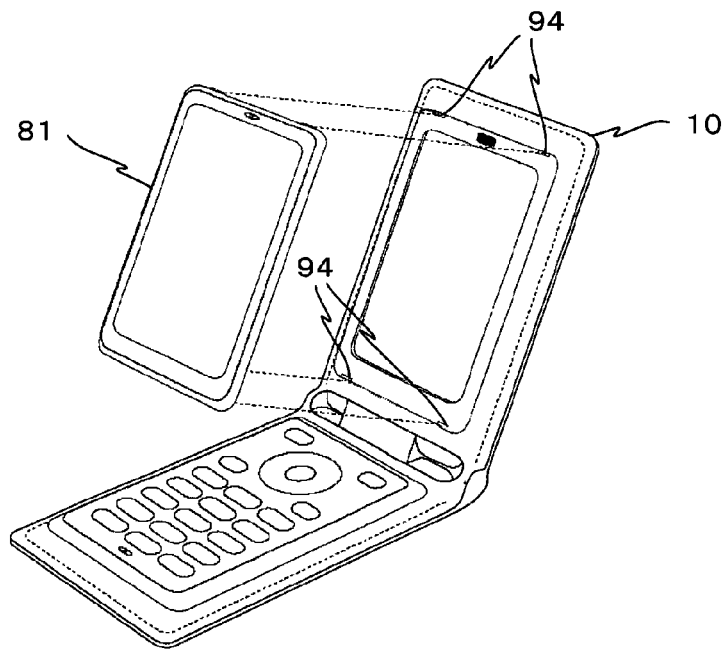
FIG. 5A is a figure showing a situation in which a display surface panel 81 which is fixed by claws is being fitted.
Figure 5B:
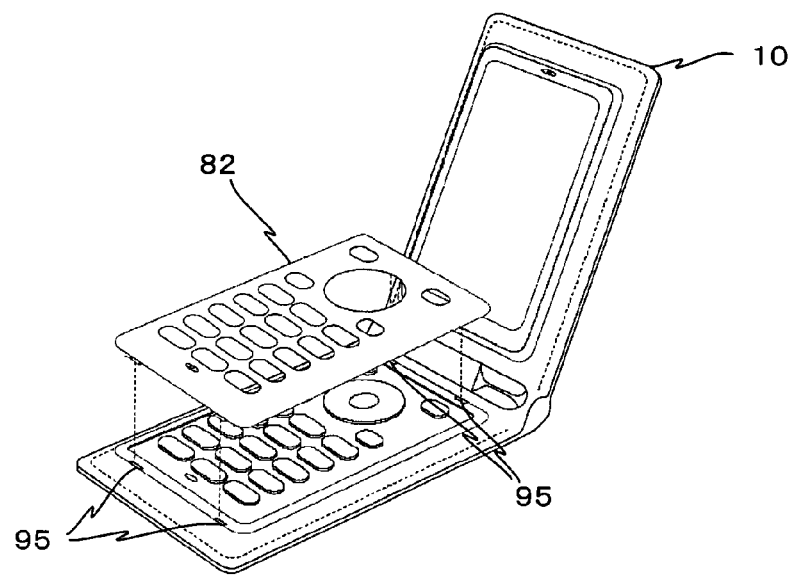
FIG. 5B is a figure showing a situation in which an operating surface panel 82 which is fixed by claws is being fitted.

Furthermore, as shown in FIG. 5A, claw receiving portions 94 are provided at the four corner portions of the region of the display surface side portion 91 of the portable telephone 90 which is exposed via the display surface opening portion. It is possible to fit a display surface panel 81 to these claw receiving portions 94, so as to cover over the edges of the display surface opening portion 14. Moreover, as shown in FIG. 5B, just as with the display surface side portion 91, four claw receiving portions 95 are provided at four spots upon the operating surface side portion 92 of the portable telephone 90, and it is possible to fit an operating surface panel 82 to these claw receiving portions 95, so as to cover over the edges of the operating surface opening portion 15 of the cover 10. Accordingly, by these panels fixing the edges of the opening portions of the cover 10 to the portable telephone 90, it is possible to fix the cover 10 to the portable telephone 90 so that the position at which the portable telephone 90 is covered by the cover 10 does not slip. Due to this, it is possible to prevent deterioration of the functions of the portable telephone 90 due to deviation of the covering position of the cover, which might otherwise obstruct the surfaces of a member which is essential to these functions.

Thus, according to this cover 10 for a portable telephone according to the first embodiment of the present invention, along with it being possible to make the portion which is covered large since only the portions which are necessary for input and output are exposed, it is also possible to reduce the vacant space between the cover and the portable telephone. Due to this, it is possible to impart to the user an impression that the portable telephone and the cover are a single unit, and it is also possible to impart a favorable impression via his sense of sight. Moreover, along with the cover acting as a cushioning material if a shock occurs, it is also possible to ensure the same operating feeling as when no cover is fitted, even for a portable telephone to which this cover is fitted.

Furthermore, by using leather, it is possible to impart a soft texture and a sense of high quality. As a result, when choosing a cover according to his taste, the user is enabled to include among his options a cover which is made from a material such as leather or the like which is flexible.

Although, in this embodiment, it was arranged to use leather as the material for the cover, it would also be acceptable to arrange to use some other raw material which is soft, such as a textile or a non-woven fabric. If a textile or the like which has been quilted is used as the raw material for the rear surface of the cover, then it is possible further to enhance the shock absorption characteristic. Furthermore, when a raw material which is stretchable is used, then, along with it being possible to enhance the integration of the cover and the portable telephone by yet a further level, it also becomes easy to reduce deviation of the cover from its proper covering position.

Moreover although, in this embodiment, each of the front surface leather portion and the rear surface leather portion was made as just one layer, it would, of course, also be acceptable to arrange to use a sandwich of two or more layers, or a combination of other raw materials, as the front surface raw material or as the rear surface raw material. It should be understood that the same raw material may be used for both the front surface raw material and the rear surface raw material; or, alternatively, different types of raw material may be used. Furthermore, as described above, it would also be acceptable to stitch together the front surface raw material and the rear surface raw material using various methods; or it would also be acceptable to glue them together using various types of adhesive. Moreover, it would also be acceptable to pressure-adhere them together with thermocompression bonding or the like.

Figure 6A:
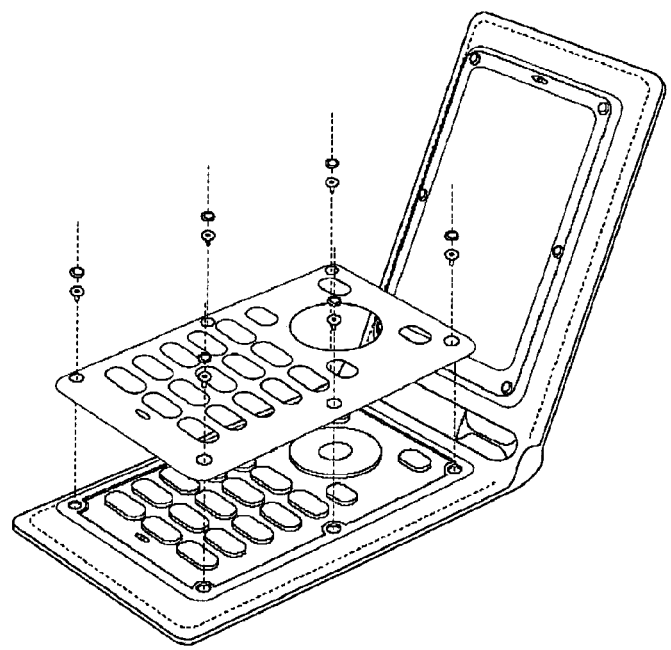
FIG. 6A is a figure showing a situation in which an operating surface panel which is fixed by screws is being fitted.
Figure 6B:
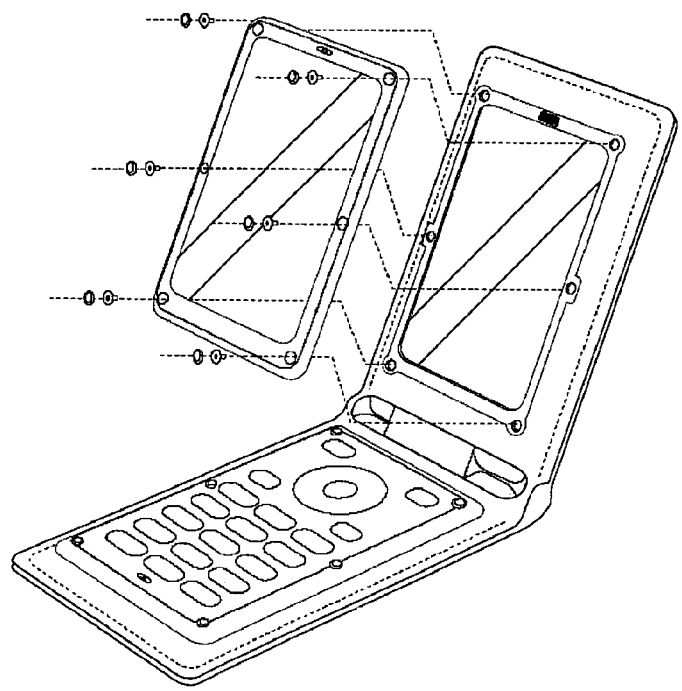
FIG. 6B is a figure showing a situation in which a display surface panel which is fixed by screws is being fitted.

Furthermore although, in this embodiment, it was arranged for the display surface panel 81 and the operating surface panel 82 to be attached by claws, it would also be acceptable, as shown in FIGS. 6A and 6B, for them to be attached by screws.

Figure 7:
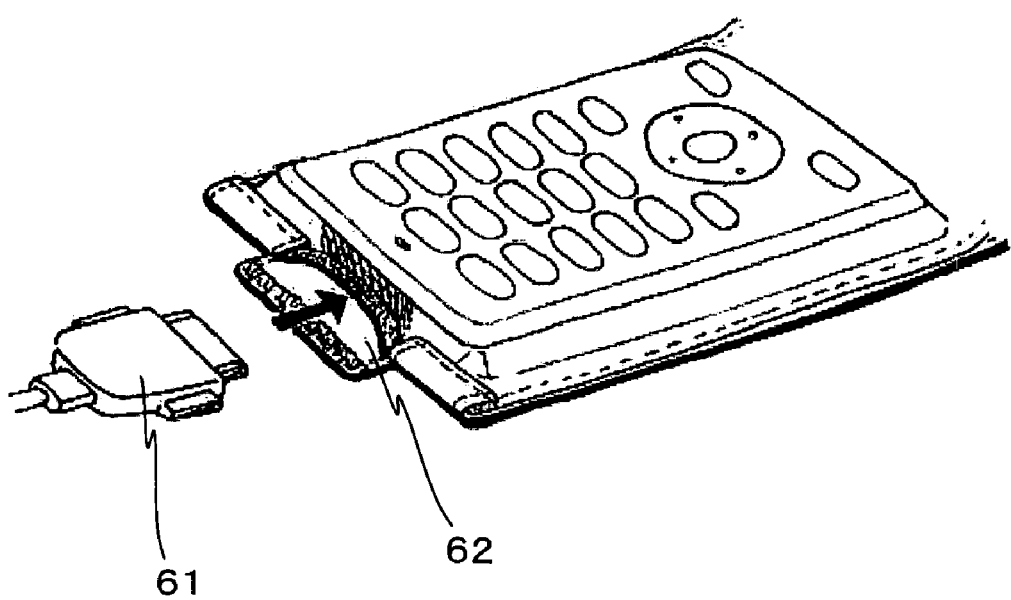
FIG. 7 is a figure showing a situation in which a connector is being fitted.

Yet further, as shown in FIG. 7, in this embodiment, an opening portion 62 may be provided which can be opened and closed, so that it is possible to connect a connector 61 for power supply and for data communication.

Still further although, in this embodiment, it was supposed that the information input-output portion consisted of a display screen and a key input device of a portable telephone, it would also be acceptable to further provide a camera, and to arrange to provide an opening portion in the rear surface leather portion 12 or the like, so as to expose the optical system of this camera. In this case, furthermore, just as with the display surface panel 81 and so on described above, it would also be acceptable to arrange to provide a camera panel which can fix the edge of this opening portion.

In the following, a second embodiment of the present invention will be explained with reference to FIGS. 8A through 10.

FIG. 8A shows an elevation view of a cover 20 for a portable telephone (hereinafter simply termed the "cover 20") according to a second embodiment of the present invention; and FIG. 8B shows a rear view of this cover 20. As shown in FIGS. 8A and 8B, this cover 20 is manufactured by stitching together, by seams 24 and 25, three pieces of leather: a display surface front surface leather portion 21, an operating surface front surface leather portion 22, and a rear surface leather portion 23. Furthermore, as shown in FIG. 8A, the display surface front surface leather portion 21 of the cover 20 comprises a display surface opening portion 26 for exposing the display screen of the display device of the portable telephone 90, while the operating surface front surface leather portion 22 comprises an operating surface opening portion 27 for exposing an operating surface of an input device of the portable telephone. Moreover, between the display surface front surface leather portion 21 and the operating surface front surface leather portion 22 of the cover 20, there is a fitting gap portion 28 for fitting the cover 20 onto the portable telephone.

Figure 9:
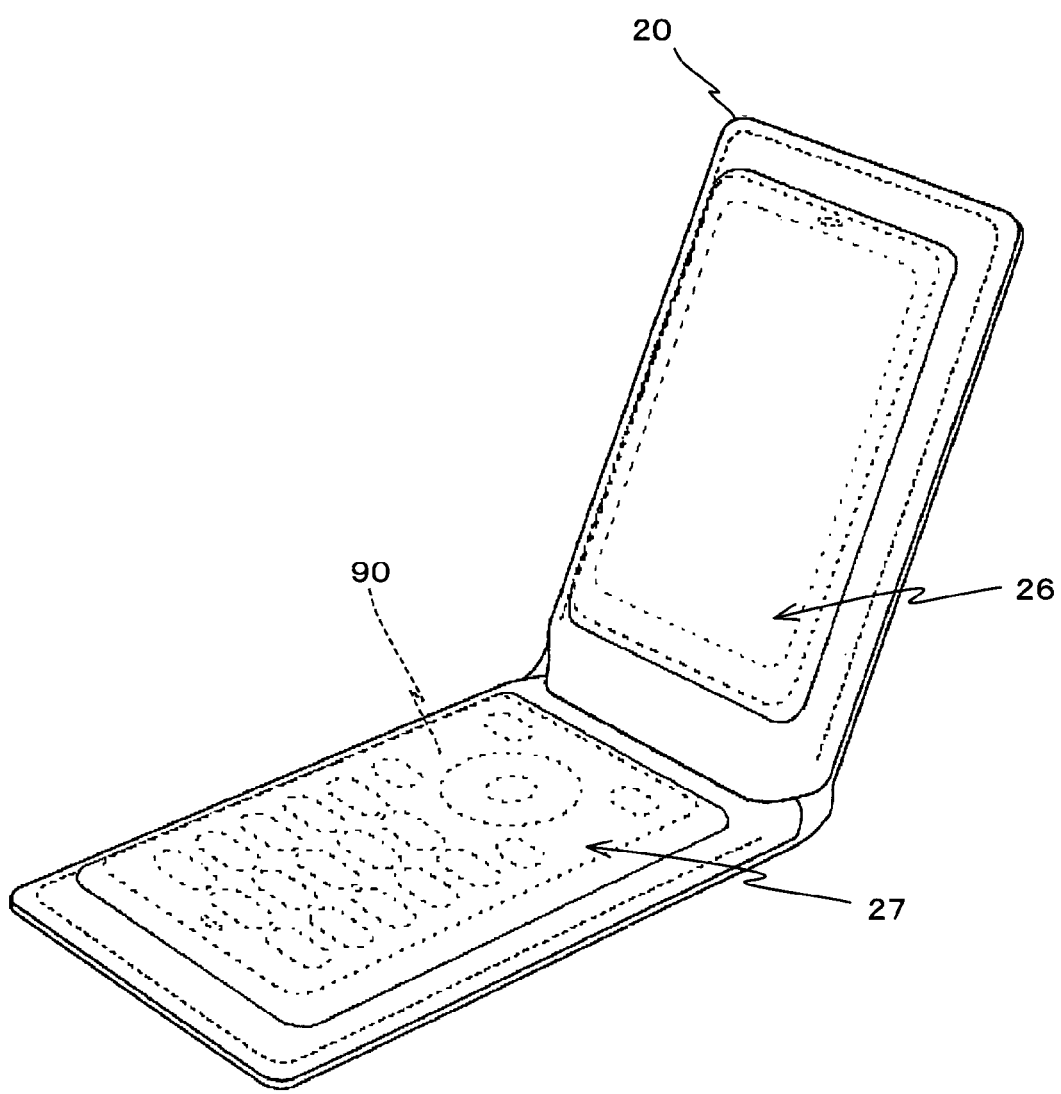
FIG. 9 is a figure showing a situation in which the cover 20 shown in FIGS. 8A and 8B is fitted upon a portable telephone 90.

In FIG. 9, the cover 20 is shown in its state in which it has been fitted to the portable telephone 90. In this figure, the portable telephone 90 is shown by the dotted lines. As shown in this figure, even in the state in which the cover 20 has been fitted, the user is able to check the display screen of the portable telephone 90 from the display surface opening portion 26 of the cover 20, and he is able to actuate the input device of the portable telephone 90 from its operating surface opening portion 27. It should be understood that although, in FIG. 9, the display surface front surface leather portion 21 and the operating surface front surface leather portion 22 are overlapped at their one portions in the vicinity of the folded portion, it would also be acceptable for this portion thereof not to be overlapped.

Figure 10:
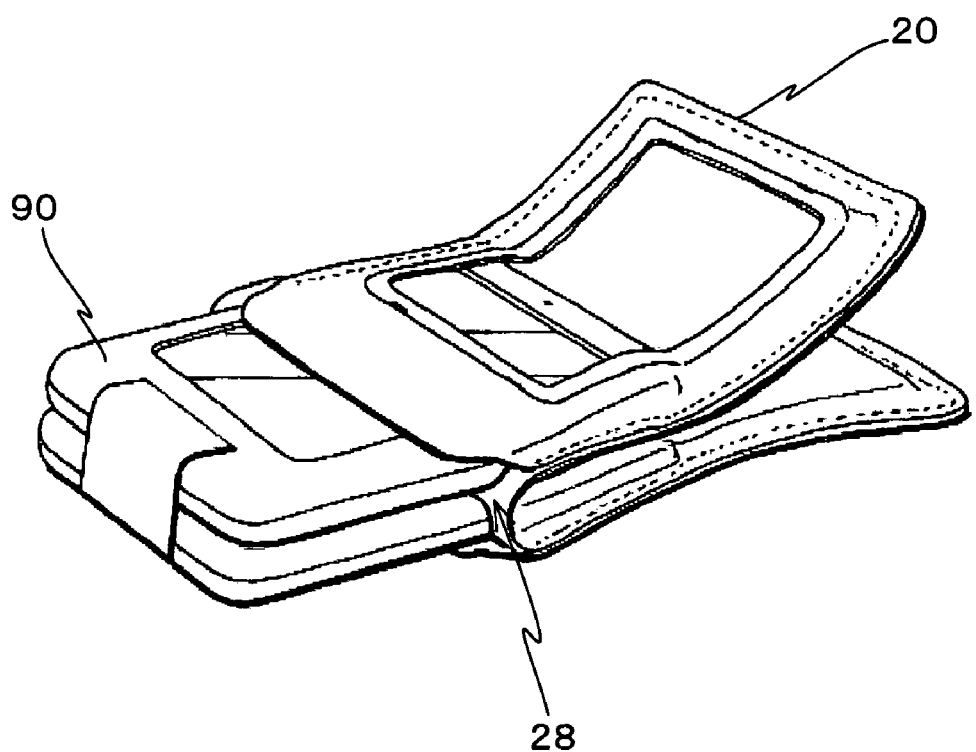
FIG. 10 is a figure showing the situation when the cover 20 shown in FIGS. 8A and 8B is being fitted.

Since this portable telephone 90 is the portable telephone which has been explained with regard to FIG. 3 of the first embodiment, and can be folded in the direction for its operating surface and its display screen to face mutually away from one another, accordingly, as shown in FIG. 10, fitting of the cover 20 to the portable telephone 90, or removal thereof therefrom, can be performed by using the fitting gap portion 28 of the cover 20.

Moreover, in the same manner as shown in FIG. 5A and FIG. 5B with reference to the first embodiment, a display surface panel 81 and an operating surface panel 82 are fitted so as, respectively, to cover the edges of the display surface opening portion 26 and of the operating surface opening portion 27 of the cover 20. According to this, by these panels fixing the opening portion of the cover 20 to the portable telephone 90, in the same manner as in the case of the first embodiment described above, there is no invitation to decrease the functionality of the portable telephone 90 due to the cover position becoming displaced.

Thus, according to the cover for a portable telephone 20 according to the second embodiment of the present invention, in the same manner as in the case of the first embodiment previously described, along with it being possible to make the portion which is covered large since only the portions which are necessary for input and output are exposed, it is also possible to reduce the vacant space between the cover and the portable telephone. Due to this, it is possible to impart to the user an impression that the portable telephone and the cover are a single unit, and it is also possible to impart a favorable impression via his sense of sight. Moreover, along with the cover acting as a cushioning material if a shock occurs, it is also possible to ensure the same operating feeling as when no cover is fitted, even for a portable telephone to which this cover is fitted.

Furthermore, in the same manner as in the case of the first embodiment previously described, by using leather or some other raw material, it is possible to impart a soft texture and a sense of high quality. As a result, when choosing a cover according to his taste, the user is enabled to include among his options a cover which is made from a material such as leather or the like which is flexible.

It should be understood that it would be possible to implement the same variations in this embodiment, as in the case of the first embodiment described above.

In the following, a third embodiment of the present invention will be explained with reference to FIGS. 11A through 13.

FIG. 11A shows an elevation view of a cover 30 for a portable telephone according to the third embodiment of the present invention (hereinafter simply termed the "cover 30"), and FIG. 11B shows a rear view of this cover 30. As shown in FIGS. 11A and 11B, this cover 30 is manufactured by stitching together two pieces of leather, a front surface leather portion 31 and a rear surface leather portion 32, with a seam 35, except for a portion on their right side surfaces. The right side surface of the cover 30 is a fitting fastener portion 37, in which a fastener which can be opened and closed for fitting the cover 30 over the portable telephone is stitched with seams. Furthermore, as shown in FIG. 11A, the front surface leather portion 31 of the cover 30 is provided with a display surface opening portion 33 for exposing a display screen of a display device of the portable telephone, and an operating surface opening portion 34 for exposing an operating surface of an input device of the portable telephone.

Figure 12:
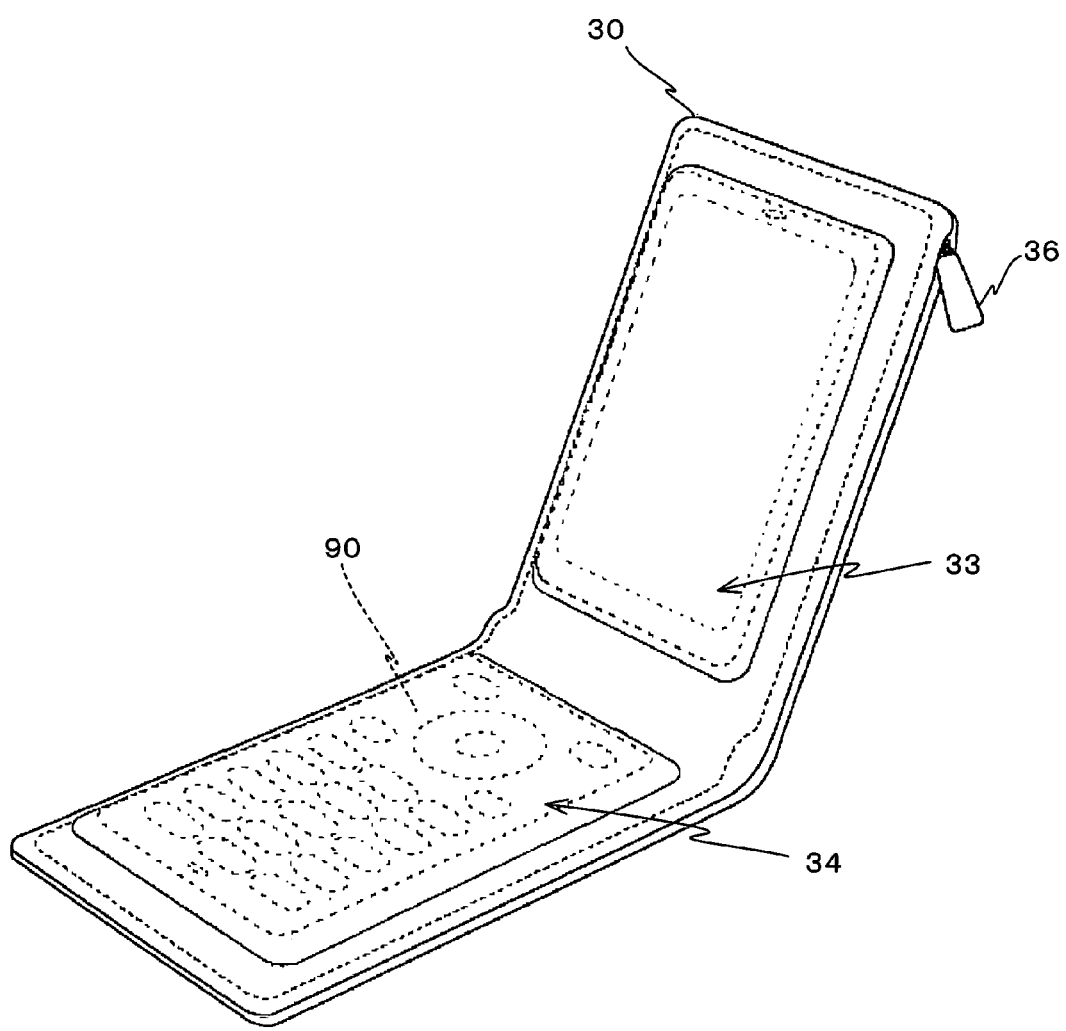
FIG. 12 is a figure showing a situation in which the cover 30 shown in FIGS. 11A and 11B is fitted upon a portable telephone 90.

In FIG. 12, the cover 30 is shown in its state in which it has been fitted to the portable telephone 90. In this figure, the portable telephone 90 is shown by the dotted line. As shown in FIG. 12, even in the state in which the cover 20 has been fitted, the user is able to check the display screen of the portable telephone 90 from the display surface opening portion 33 of the cover 30, and he is able to actuate the input device of the portable telephone 90 from the operating surface opening portion 34.

Figure 13:
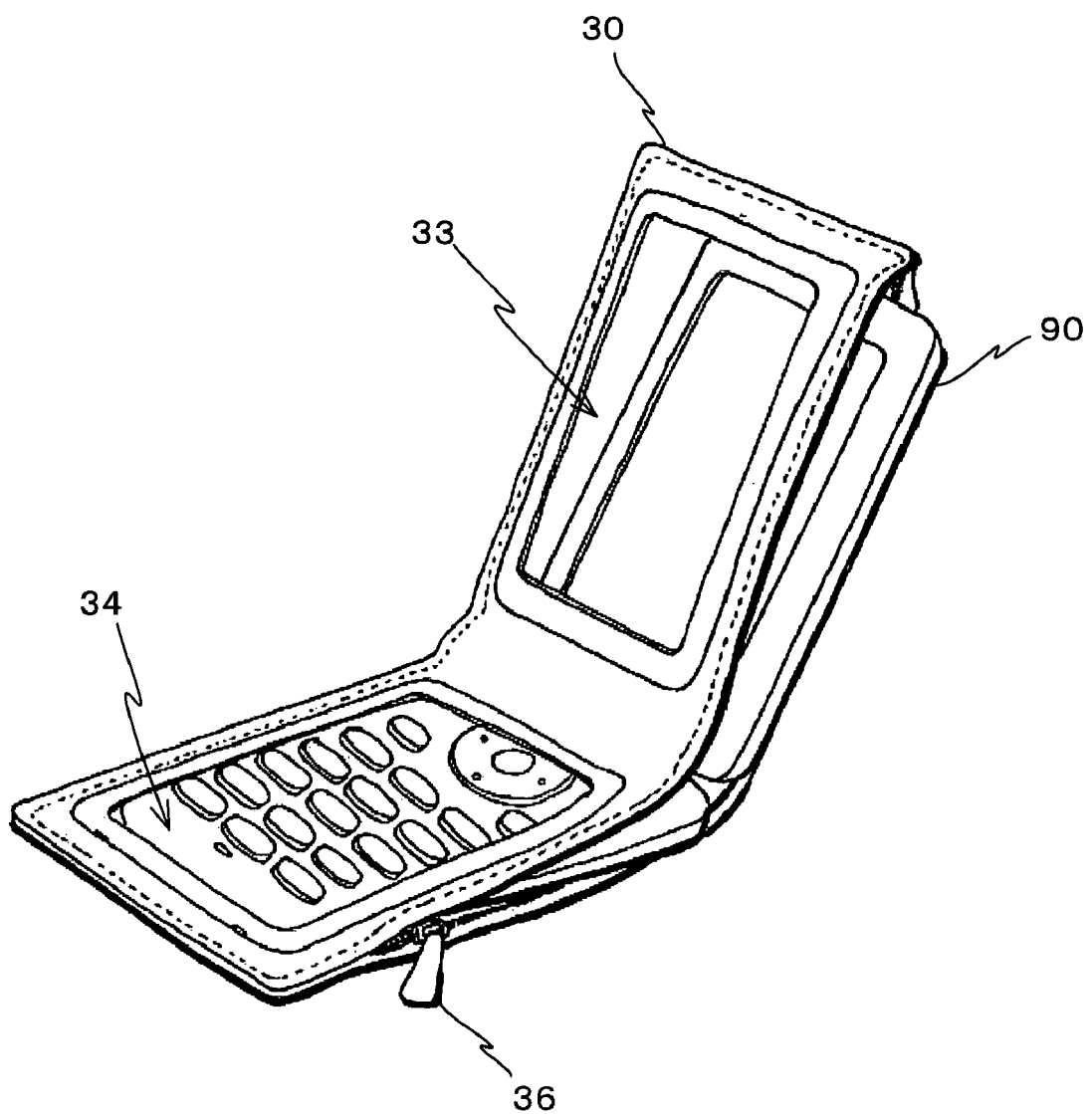
FIG. 13 is a figure showing the situation when the cover 30 shown in FIGS. 11A and 11B is being fitted.

In FIG. 13, there is shown the situation when the cover 30 is being fitted upon the portable telephone 90. As shown in FIG. 13, with this cover 30, by opening the fitting fastener portion 37 using a slider 36, it is possible to insert the portable telephone from this portion, and thereby to fit the cover 30. Furthermore, during removal as well, in the same manner, it is possible to perform removal of the cover 30 by opening its fitting fastener portion 37.

Moreover, in the same manner as shown in FIG. 5A and FIG. 5B with reference to the first embodiment, a display surface panel 81 and an operating surface panel 82 are fitted so as, respectively, to cover the edges of the display surface opening portion 33 and of the operating surface opening portion 34 of the cover 30. Due to this, by these panels fixing the opening portion of the cover 30 to the portable telephone 90, in the same manner as in the case of the first embodiment described above, there is no invitation to decrease the functionality of the portable telephone 90 due to the cover position becoming displaced.

Thus, according to this cover 30 for a portable telephone according to the third embodiment of the present invention, in the same manner as in the case of the first embodiment previously described, along with it being possible to make the portion which is covered large since only the portions which are necessary for input and output are exposed, it is also possible to reduce the vacant space between the cover and the portable telephone. Due to this, it is possible to impart to the user an impression that the portable telephone and the cover are a single unit, and it is also possible to impart a favorable impression via his sense of sight. Moreover, along with the cover acting as a cushioning material if a shock occurs, it is also possible to ensure the same operating feeling as when no cover is fitted, even for a portable telephone to which this cover is fitted.

Furthermore, in the same manner as in the case of the first embodiment described above, by using a raw material such as leather or the like, it is possible to impart a soft texture and a sense of high quality. As a result, when choosing a cover according to his taste, the user is enabled to include among his options a cover which is made from a material such as leather or the like which is flexible. It should be understood that it would also be acceptable to provide a long and narrow opening portion (not shown in FIGS. 11A, 12 and 13) between the display surface opening portion 33 and the operating surface opening portion 34, so as not to connect together these two opening portions. By employing this long and narrow opening portion, it becomes possible to prevent the cover becoming bunched up at this portion when the portable telephone 90 is folded up, and it becomes possible reliably to perform folding of the portable telephone, just as before fitting the cover.

It should be understood that although, in this embodiment, a portable telephone 90 is employed which can be folded both in the direction in which its operating surface and its display screen mutually face towards one another, and in the direction in which its operating surface and its display screen mutually face away from one another to the outside, it would also be possible to employ a portable telephone which can be folded only in one direction, or to employ a portable telephone which is not of a foldable type.

Furthermore, it would be possible to implement the same variations in this embodiment, as in the case of the first and second embodiments described above.

In the following, a fourth embodiment of the present invention will be explained with reference to FIGS. 14A through 16.

FIG. 14A shows an elevation view of a cover 40 for a portable telephone according to this fourth embodiment of the present invention (hereinafter simply termed the "cover 40"); and FIG. 14B shows a rear view of this cover 40. As shown in FIGS. 14A and 14B, this cover 40 is manufactured by stitching together two pieces of leather, a front surface leather portion 41 and a rear surface leather portion 42, by a seam 47, except for a lower surface portion. The lower surface portion of the cover 40 is a fitting opening portion 45 for fitting the cover 40 over the portable telephone, and this fitting opening portion 45 can be closed by overlapping together Velcro tapes at two fitting tape portions 46 at two spots thereof. Furthermore, as shown in FIG. 14A, the front surface leather portion 41 of the cover 40 comprises a display surface opening portion 43 for exposing the display screen of the display device of the portable telephone, and an operating surface opening portion 44 for exposing an operating surface of an input device of the portable telephone.

Figure 15:
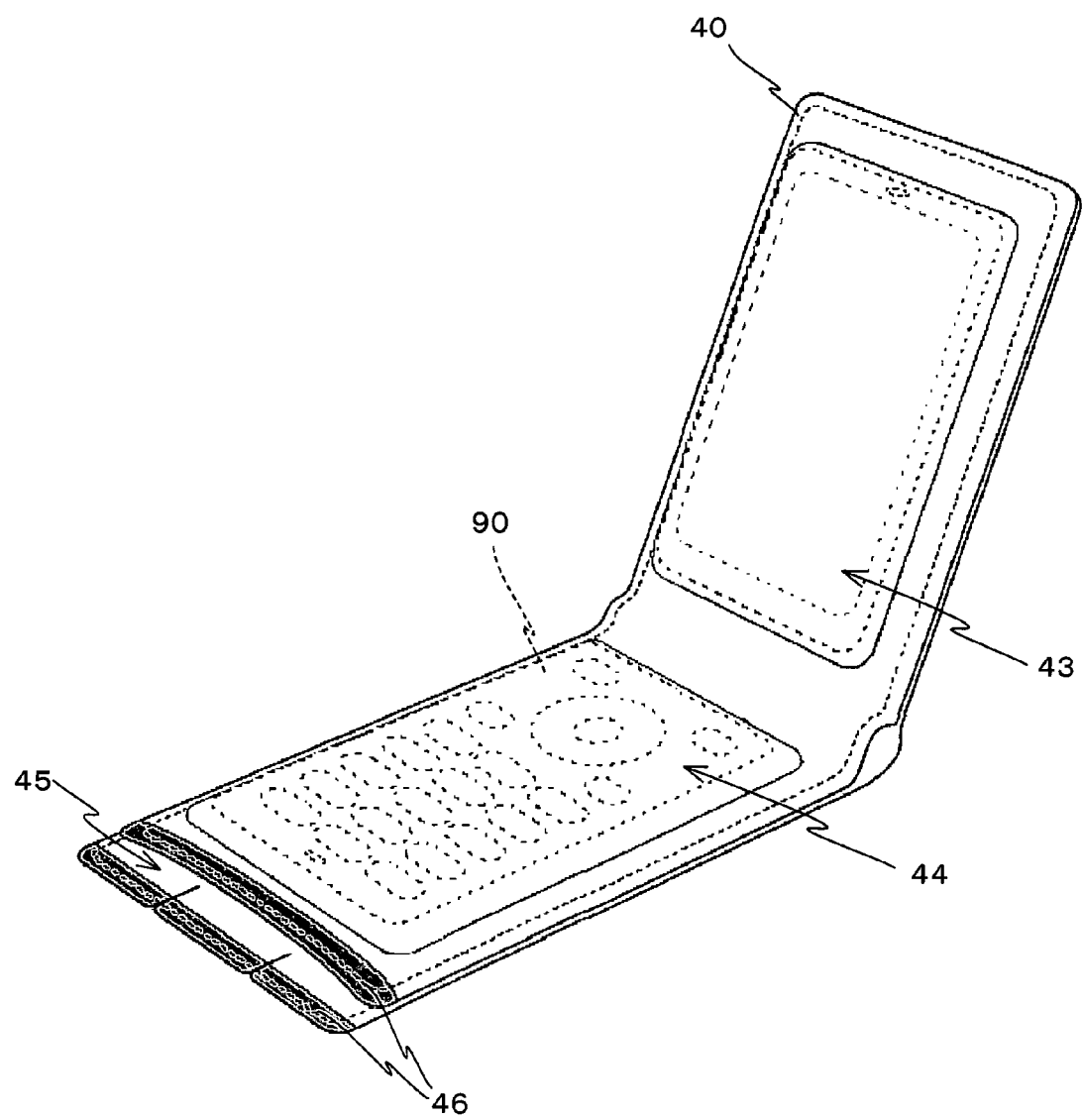
FIG. 15 is a figure showing a situation in which the cover 40 shown in FIGS. 14A and 14B is fitted upon a portable telephone 90.

In FIG. 15, the cover 40 is shown in its state in which it has been fitted to the portable telephone 90. In this figure, the portable telephone 90 is shown by the dotted lines. As shown in this FIG. 15, even in the state in which the cover 40 has been fitted, the user is able to check the display screen of the portable telephone 90 from the display surface opening portion 43 of the cover 40, and he is able to actuate the input device of the portable telephone 90 from its operating surface opening portion 44.

Figure 16:
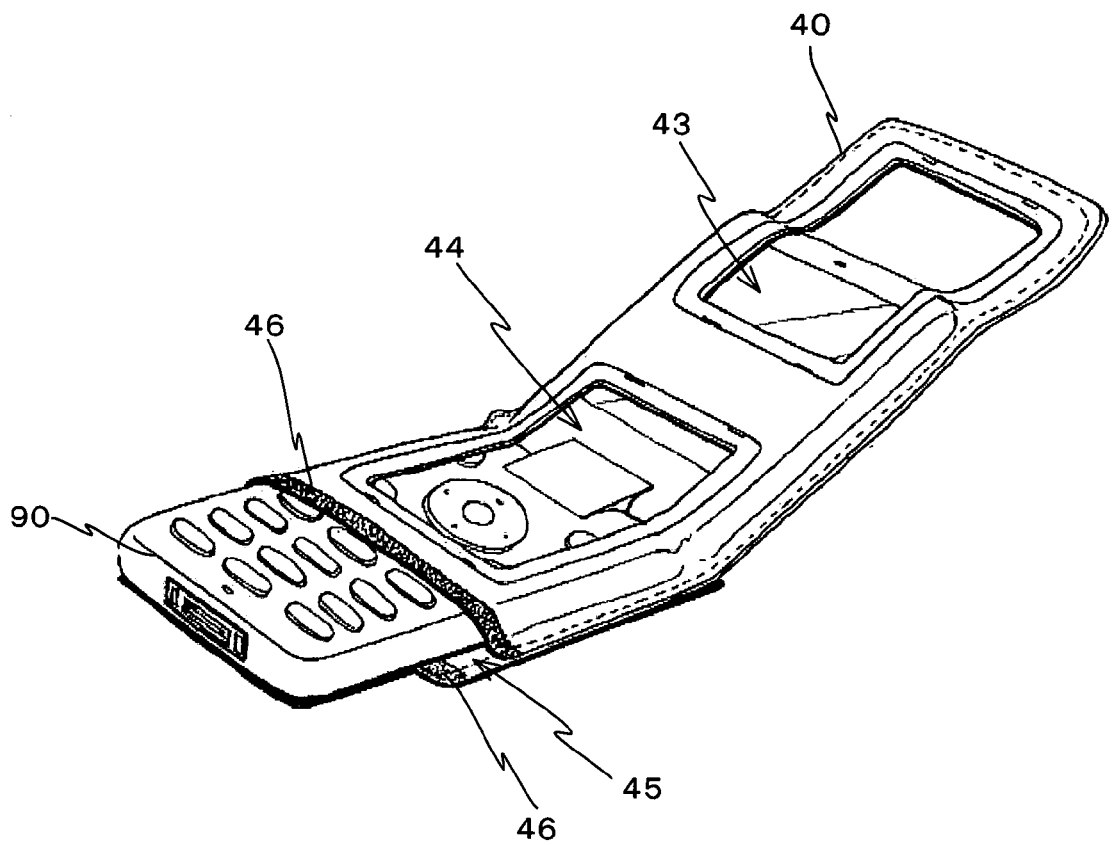
FIG. 16 is a figure showing the situation when the cover 40 shown in FIGS. 14A and 14B is being fitted.

As shown in FIG. 16, with this cover 40, by separating the Velcro tapes on the fitting tape portions 46, it is possible to perform fitting and removal of the cover 40 to and from the portable telephone 90 by utilizing the fitting opening portion 45.

Moreover, in the same manner as shown in FIG. 5A and FIG. 5B with reference to the first embodiment, a display surface panel 81 and an operating surface panel 82 are fitted so as, respectively, to cover the edges of the display surface opening portion 43 and of the operating surface opening portion 44 of the cover 40. According to this, by these panels fixing the opening portion of the cover 40 to the portable telephone 90, in the same manner as in the case of the first embodiment described above, there is no invitation to decrease the functionality of the portable telephone 90 due to the cover becoming displaced from its covering position.

Thus, according to the cover for a portable telephone 40 according to the fourth embodiment of the present invention, in the same manner as in the case of the first embodiment previously described, along with it being possible to make the portion which is covered large since only the portions which are necessary for input and output are exposed, it is also possible to reduce the vacant space between the cover and the portable telephone. Due to this, it is possible to impart to the user an impression that the portable telephone and the cover are a single unit, and it is also possible to impart a favorable impression via his sense of sight. Moreover, along with the cover acting as a cushioning material if a shock occurs, it is also possible to ensure the same operating feeling as when no cover is fitted, even for a portable telephone to which this cover is fitted.

Furthermore, in the same manner as in the case of the first embodiment previously described, by using a leather product, it is possible to impart a soft texture and a sense of high quality. As a result, when choosing a cover according to his taste, the user is enabled to include among his options a cover which is made from a material such as leather or the like which is flexible.

Furthermore, it would be possible to implement the same variations in this embodiment, as in the case of the second and third embodiments described above.

In the following, a fifth embodiment of the present invention will be explained with reference to FIGS. 17A through 19B.

Figure 17A:
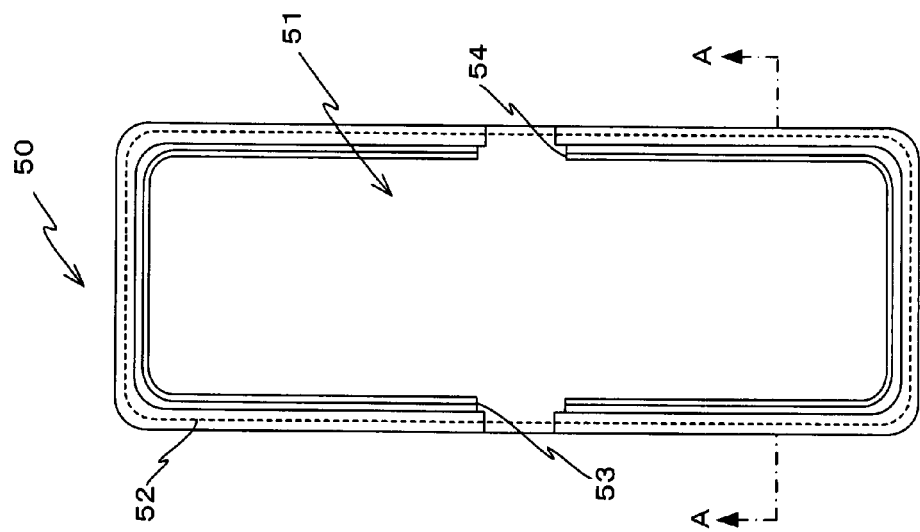
FIG. 17A is an elevation view of a cover 50 for a portable telephone according to a fifth embodiment of the present invention.
Figure 17B:
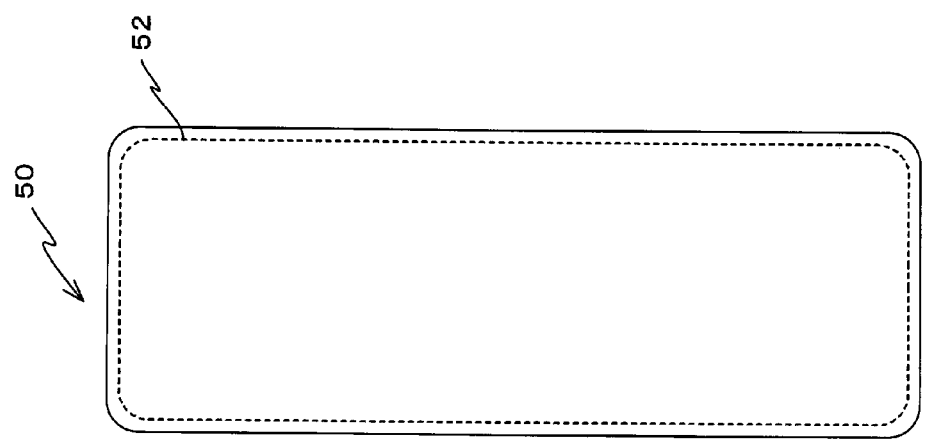
FIG. 17B is a rear view of this cover 50 for a portable telephone according to the fifth embodiment of the present invention.

FIG. 17A shows an elevation view of a cover 50 for a portable telephone according to the fifth embodiment of the present invention (hereinafter simply termed the "cover 50"), and FIG. 17B shows a rear view of this cover 50. As shown in FIG. 17A, this cover 50 is manufactured from a piece of leather 51 and attachment resin members 53 and 54, with portions of these attachment resin members 53 and 54 being made so that they can be sewn on to the cover 50.

Figure 17C:
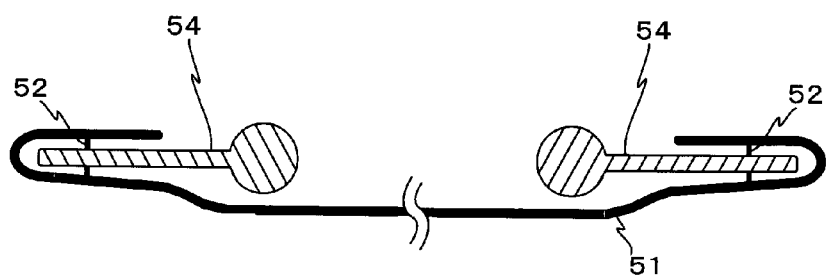
FIG. 17C is a sectional view of this cover 50 for a portable telephone according to the fifth embodiment of the present invention.

FIG. 17C shows a sectional view taken along the lines A-A in FIG. 17A. As shown in FIG. 17C, the attachment resin member 54 is made from a plate shaped portion which is sewn on to the piece of leather 51, and a cylindrical pillar shaped projecting portion for fixing the cover 50 to the portable telephone. The attachment resin member 54 is fastened to the piece of leather 51 by the piece of leather 51 being folded back around the edge of this plate shaped portion, and being sewn by a seam 52, in the state shown in FIG. 17C.

Figure 18A:
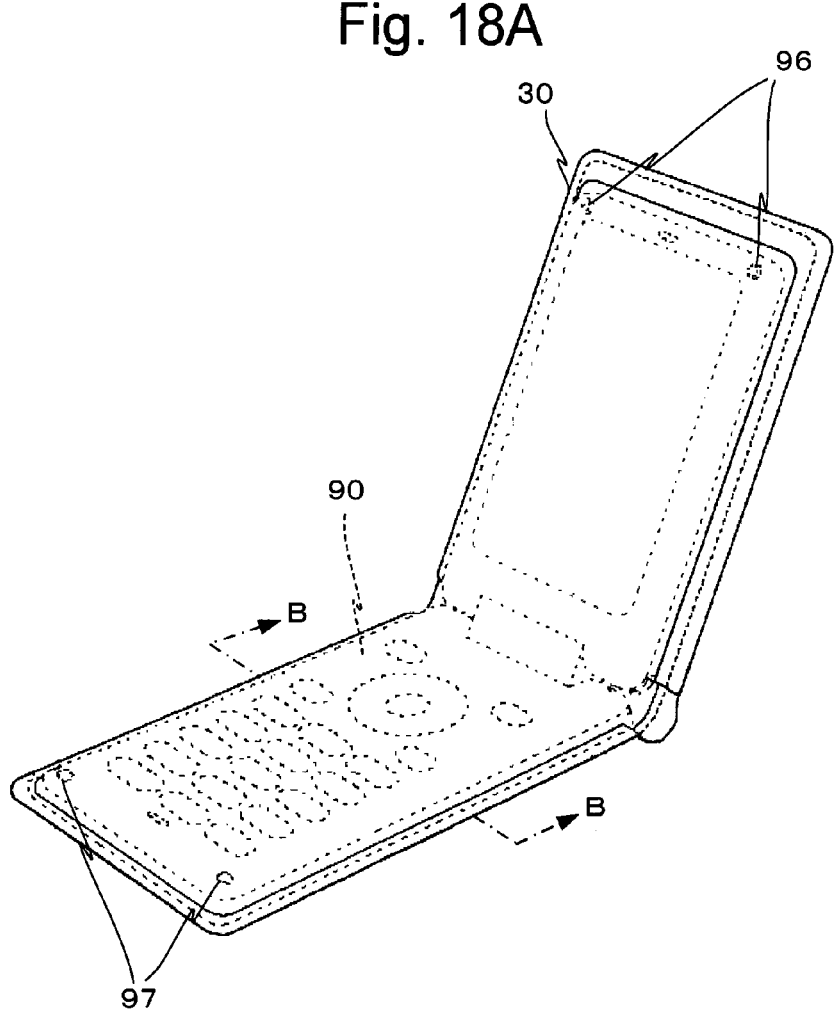
FIG. 18A is a figure showing a situation in which the cover 50 shown in FIGS. 17A and 17B is fitted upon a portable telephone 90.

In FIG. 18A, the cover 50 is shown in its state in which it has been fitted to the portable telephone 90. In this figure, the portable telephone 90 is shown by the dotted lines. As will be described hereinafter, fixing screws 96 and 97 which are required for fitting and removing the cover 50 are provided to the portable telephone 90. As shown in this FIG. 18A, even in the state in which the cover 50 has been fitted, the user is able to check the display screen of the portable telephone 90, and he is able to actuate its input device.

Figure 18B:
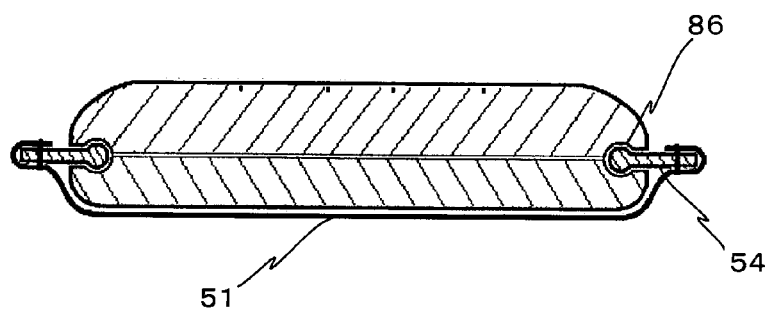
FIG. 18B is a sectional view of the state in which the cover 50 shown in FIGS. 17A and 17B is fitted upon the portable telephone 90.

In FIG. 18B, there is shown a sectional view of the operating surface side portion 92 of the portable telephone 90 taken along the lines B-B in FIG. 18A. As shown in FIG. 18B, this cover 50 is fixed to the portable telephone 90 by inserting the projecting portion of the attachment resin member 54 into an internal groove 86 in the operating surface side portion 92 of the portable telephone 90. Furthermore, it is fixed in the same manner to the display surface side portion 91 of the portable telephone 90 as well, by employing the attachment resin member 53 and a groove 85 shown in FIG. 19A.

Figure 19A:
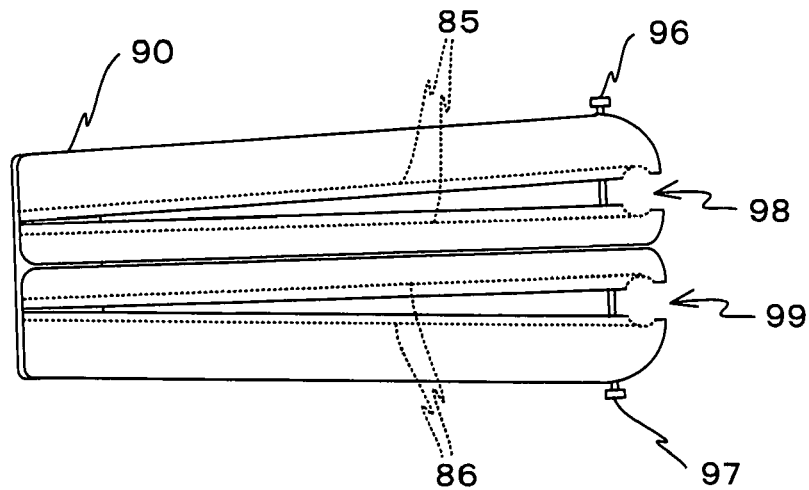
FIG. 19A is a side view of the portable telephone 90 to which the cover 50 shown in FIGS. 17A and 17B is fitted.
Figure 19B:
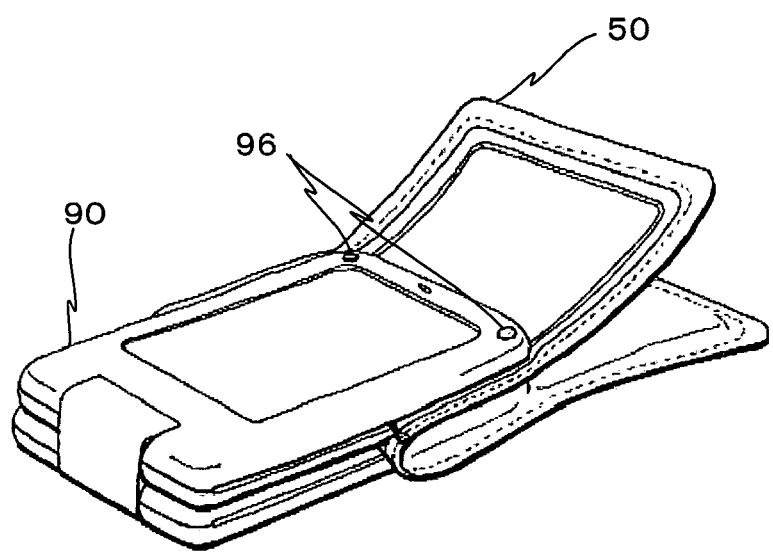
FIG. 19B is a figure showing the situation when the cover 50 shown in FIGS. 17A and 17B is being fitted.

Since this portable telephone 90 can be folded up in the same manner as in the case of the first embodiment, so that its operating surface and its display screen both face in the direction to the outside, if fixing screws 96 and fixing screws 97 are loosened in this folded up shape as shown in FIG. 19A, then respective gaps 98 and 99 appear at the display surface side portion 91 and the operating surface side portion 92. Accordingly, by taking advantage of these gaps 98 and 99, as shown in FIG. 19B, it is possible to insert the attachment resin members 53 and 54 of the cover 50 into the grooves 85 and 86, so that it is possible to fit the cover 50.

Thus, according to the cover for a portable telephone 50 according to the fifth embodiment of the present invention, in the same manner as in the case of the first embodiment previously described, along with it being possible to make the portion which is covered large since only the portions which are necessary for input and output are exposed, it is also possible to reduce the vacant space between the cover and the portable telephone, so that it is possible to impart to the user an impression that the portable telephone and the cover are a single unit. Due to this, along with the cover acting as a cushioning material if a shock occurs, it is also possible to ensure the same operating feeling as when no cover is fitted, even for a portable telephone to which this cover is fitted.

Furthermore, in the same manner as in the case of the first embodiment previously described, by using leather or some other raw material, it is possible to impart a soft texture and a sense of high quality. As a result, when choosing a cover according to his taste, the user is enabled to include among his options various covers which are made from a material such as leather or the like which is flexible.

Although, in this embodiment, it was arranged to use leather as the material for the cover, it would also be acceptable to arrange to use some other raw material which is soft, such as a fabric, a textile including knitted material, or a non-woven fabric or the like. If a textile or the like which has been quilted is used as the raw material for the rear surface of the cover, then it is possible further to enhance the shock absorption characteristic. Furthermore, when a raw material which is stretchable is used, then, along with it being possible to enhance the integration of the cover and the portable telephone by yet a further level, it also becomes easy to reduce deviation of the cover from its proper covering position.

Moreover although, in this embodiment, each of the front surface leather portion and the rear surface leather portion was made as just one layer, it would, of course, also be acceptable to arrange to use a sandwich of two or more layers, or a combination of other raw materials, as the front surface raw material or as the rear surface raw material. It should be understood that the same raw material may be used for both the front surface raw material and the rear surface raw material; or, alternatively, different types of raw material may be used. Furthermore, as described above, it would also be acceptable to stitch together the front surface raw material and the rear surface raw material using various methods; or it would also be acceptable to glue them together using various types of adhesive. Moreover, it would also be acceptable to pressure-adhere them together with thermocompression bonding or the like.

Still further although, in this embodiment, it was supposed that the information input-output portion consisted of a display screen and a key input device of a portable telephone, it would also be acceptable to further provide a camera, and to arrange to provide an opening portion in the leather 51, so as to expose the optical system of this camera. In this case, furthermore, just as with the display surface panel 81 and so on in the first embodiment previously described, it would also be acceptable to arrange to provide a camera panel which can fix the edge of this opening portion.

As explained above, the cover for a mobile communication terminal and the mobile communication terminal according to the present invention can be applied to a mobile communication terminal such as a portable telephone, among others.

What is claimed is:

1. A cover for a mobile communication terminal that can be rotated to fold up, characterized by being made from a material which is flexible, and by covering a side wall surface which contacts, at an edge, a surface upon which is provided an information input-output portion of said mobile communication terminal which performs input-output of information, so as to expose at least a portion of said information input-output portion, said cover comprising a narrow and long opening portion at a portion thereof which covers a rotational axis portion for said folding up rotation, such that said mobile communications terminal can be inserted from said opening portion in the folded up state.

2. A cover for a mobile communication terminal as described in claim 1, characterized in that, in said information input-output portion which is exposed, there are included at least an actuation portion of an actuation means which is an input device, and a display portion of a display means which is an output device.

3. A cover for a mobile communication terminal, as described in claim 1, characterized by being attached by a fixed panel which is fitted to the periphery of said exposed information input-output portion.

4. A mobile communication terminal, to which a cover for a mobile communication terminal as described in claim 1 can be fitted.

5. A cover for a mobile communication terminal, which is made from a flexible material and a member for fixing, and which is attached by said member for fixing being fixed to a side wall surface which contacts, at an edge, a surface upon which an information input-output portion of said mobile communication terminal which performs input-output of information is provided, so as to expose at least a portion of said information input-output portion, wherein said mobile communication terminal is capable of being rotated and folded, and characterized by being fitted and removed with said mobile communication terminal in its folded state.

\* \* \* \* \*